United States Patent Office 3,409,815
Patented Nov. 5, 1968

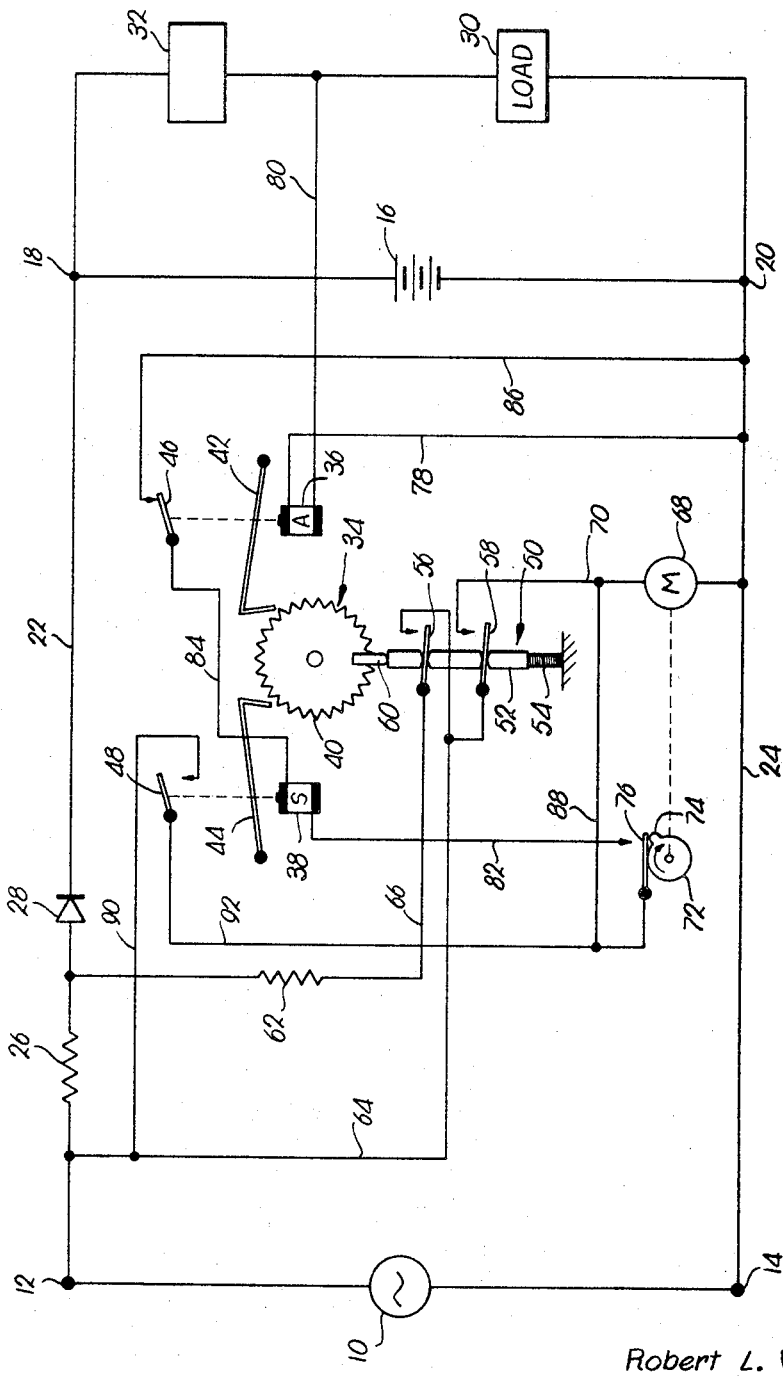

3,409,815
DUAL RATE BATTERY CHARGER WITH HIGH RATE CONTROLLED BY AMOUNT OF DISCHARGE
Robert L. Wright and Philip G. Chance, Centralia, Mo., assignors to A. B. Chance Company, Centralia, Mo., a corporation of Missouri
Filed May 3, 1966, Ser. No. 547,214
6 Claims. (Cl. 320—10)

ABSTRACT OF THE DISCLOSURE

A battery charger utilizes a constant current source to trickle charge a storage battery to compensate for self-discharge. Each demand for load current from the battery is registered by a totalizer in the form of a stepper relay having add and subtract solenoids that operate a ratchet wheel. The add solenoid is energized with each demand, and the subtract solenoid is subsequently energized following a predetermined time period during which increased, high level charging current is delivered to the battery. The totalizer continues to register any subsequent demands and serves as a memory of such demands, the accumulated total being reduced by one each time the subtract solenoid is energized. Therefore, the battery is subjected to the high level charging current for a time duration proportional to the number of demands and until the totalizer is returned to its zero registration condition.

This invention relates to a dual level, constant current battery charger especially adapted for applications wherein irregularly timed load demands are encountered.

The advent of the nickel cadmium battery as a self-contained direct current source has placed increased emphasis on the design of battery chargers to accommodate the applications which now utilize nickel cadmium battery packs as a primary or auxiliary source. Presently, two types of chargers generally referred to as constant voltage chargers and constant current chargers are in common use. The constant voltage charger depends upon an increase of terminal voltage of the battery during charging to reduce the charging current to, in turn, prevent overcharge. However, as compared with lead acid batteries, the terminal voltage of nickel cadmium cells drops by only a small percentage during a substantial portion of its discharge capacity. Therefore, elaborate voltage regulation circuits are required when constant voltage chargers are utilized with nickel cadmium batteries in order to prevent overcharge and possible battery damage.

Constant current charging is a less expensive and simpler charging technique and involves the use of a charger supply voltage which is substantially greater than the battery voltage. The current in the charging circuit is limited by resistors so that the charger presents substantially a constant current source to the battery terminals. If it is desired to compensate for self-discharge, the charging current is set at a low level to trickle charge the battery. Low level charging, however, has an inherent disadvantage in that the battery will never be completely recharged if it is subjected to frequent high current discharge cycles.

Although higher charging currents may be utilized to overcome the disadvantages of trickle charging, the problem is then presented of selecting a current magnitude such that load demands will be compensated without overcharging. This is difficult if load demands are infrequent and at erratic time intervals since, between demands, a period of time may elapse which would permit the higher charging current to overcharge the battery, resulting in reduction of battery life and possible destruction of the cells.

It is, therefore, the primary object of this invention to provide a constant current battery charger having both a high and a low charging rate which is automatically controlled in response to the recharging needs of the battery, so that the advantages of constant current charging discussed above may be realized without the disadvantages inherent in a single charging rate.

As a corollary to the foregoing object, it is an important aim of this invention to provide such a charger that will quickly recharge the battery after irregularly occurring load demands and then automatically return to a low level, trickle charging rate thereafter.

Another important object of the instant invention is to provide a dual level battery charger as aforesaid wherein the magnitude of the higher level charging current is selected in accordance with the recharging time characteristics of the battery and the load current drain therefrom expected during each load demand, and wherein a time governed control is utilized to terminate the flow of the high level charging current at the end of a time duration which is appropriately chosen in accordance with the two aforesaid factors.

Yet another important object of the invention is to provide an automatic current magnitude control for the charger which has a totalizer capable of registering the number of load current demands occurring during a period of high charging current operation, and which includes means for increasing the period of flow of the high level charging current in proportion to the number of additional demands registered by the totalizer so that, ultimately, the length of time of a given high current charge will be proportional to the number of demands made before the charger returns to its trickle charging mode.

Furthermore, it is a specific object to provide such a totalizer having a memory in which the number of repeated demands is stored, and having means for effecting a subtraction function at the end of each high level charging current period representing one load current demand, in order that the demand information in the memory will be ultimately destroyed to return the totalizer to a normal condition to, in turn, effect return of the charger to the trickle charging mode.

In the drawing:
The single figure is a diagrammatic and schematic representation of the charger apparatus of the instant invention.

The numeral 10 designates an alternating current power source which, for example, may be in the form of a commercially available 110 volt alternating current supply. Alternating current electrical energy from source 10 is delivered to a pair of supply terminals 12 and 14 for conduction to a storage battery 16, preferably of the nickel cadmium type, having its positive and negative sides connected to load terminals 18 and 20 respectively. Supply terminals 12 and 14 are connected to load terminals 18 and 20 by a charging circuit comprising a lead 22 coupled between terminals 12 and 18, and a lead 24 connected between terminals 14 and 20. A current limiting resistor 26 and a diode 28 are interposed in series in lead 22 for the purpose of supplying a rectified, trickle charging current to battery 16.

A load is diagrammatically illustrated at 30 connected in series with a controllable switching device 32, load 30 and switching device 32 being connected between load terminals 18 and 20. Load 30 may, for example, comprise a relatively low voltage, high amperage DC motor utilized for control purposes such as the operation of sectionalizing switches at remote locations along a transmission system. In such an application, source 10 would represent the power station supplying energy to the lines of the transmission system, and battery 16 would represent a DC source at the sectionalizing site utilized as a primary power means for the sectionalizing switch operator.

A stepper relay 34 is utilized as a charging current level controller and load demand memory and includes an "add" solenoid 36, a "subtract" solenoid 38, a totalizer ratchet wheel 40, a pair of pawls 42 and 44 operated by solenoids 36 and 38 respectively, a normally closed switch 46 coupled with the armature of solenoid 36, a normally open switch 48 coupled with the armature of solenoid 38, and double pole switching structure 50 controlled by ratchet wheel 40.

Switching structure 50 includes an armature 52 biased toward ratchet wheel 40 by a spring 54, and a pair of normally open switches 56 and 58 operated by armature 52. It should be noted that ratchet wheel 40 is provided with a radially outwardly extending lug 60 which, in the normal position illustrated, bears against one end of armature 52 to maintain the same in the position shown with spring 54 compressed and switches 56 and 58 open. Stepper relays of the type illustrated are conventional devices, and hence stepper 34 is illustrated only diagrammatically and in a manner to best portray the function and operation thereof in the instant invention.

When switch 56 is closed, a second resistor 62 will be connected in parallel with resistor 26 by a shunt lead 64 coupled between terminal 12 and the stationary contact of switch 56. A lead 66 is connected between the movable pole of switch 56 and resistor 62.

Lead 64 is also connected to the movable pole of switch 58 and, upon closing of the latter, establishes a power circuit to a timer motor 68 via lead 70. Motor 68 is diagrammatically illustrated as having its output shaft coupled with a rotatable cam 72 having a lobe 74 which operates a normally open cam switch 76 upon rotation of cam 72 in a clockwise direction through the major part of one revolution.

OPERATION

Under no-load conditions with switch device 32 interrupting the electrical continuity between load 30 and terminal 20, the only discharge from battery 16 will be inherent self-discharge. This loss of available battery capacity is compensated by trickle charging battery 16 by current flowing through resistor 26. It should be understood that the trickle charging current has a relatively low magnitude and that the resistance of resistor 26 is quite high as compared with the internal resistance of battery 16. Thus, substantially a constant current supply is presented to load terminals 18 and 20. For example, with 110 volts AC applied to supply terminals 12 and 14, a resistance value of resistor 26 on the order of 500 to 1,000 ohms would produce a trickle current of approximately 20 ma. through a 50 volt nickel cadmium battery. The internal resistance of such a battery is very low, thus the resistance presented by resistor 26 imparts constant current characteristics to the charging circuit.

In the description to follow, it will be assumed that load 30 is intermittently operated at irregular intervals and, during brief periods of operation, draws heavy load currents from battery 16. For example, sectionalizing switch operator motors commonly utilized with a 50 volt DC supply draw on the order of 40 amperes and have an internal resistance of approximately one ohm.

When switching device 32 closes, load current is drawn from battery 16 and add solenoid 36 is energized since the latter is connected in parallel with the load by leads 78 and 80. This moves pawl 42 into engagement with ratchet wheel 40 to advance the latter one increment in a clockwise direction, thereby disengaging lug 60 from armature 52. Spring 54 then effects closure of switches 56 and 58 to connect resistor 62 in parallel with resistor 26 and establish a power circuit to timer motor 68 via leads 64 and 70. The value of the resistance of resistor 62 is selected to effect a substantial increase in the current flowing in the charging circuit to commence high level recharging of battery 16. The magnitude of the high level current is governed by the characteristics of load 30, i.e., the current drawn thereby and the normal length of operation thereof, and the recharging rate of battery 16.

Cam switch 76 and its associated timer components control the length of the time period during which battery 16 will be subjected to the high level charging current. The period of high level charging is selected in accordance with the various factors discussed hereinabove so that, ultimately, battery 16 will receive a charge equal to the expected discharge therefrom each time load 30 is operated.

More particularly, subtract solenoid 38 is connected to the stationary contact of cam switch 76 by a lead 82, and is connected to lead 24 by a path along lead 84, through switch 46, and thence along lead 86. Lobe 74 is illustrated at the end of its time cycle; therefore, nearly one complete revolution of cam 72 will be consumed before cam switch 76 is closed by lobe 74. When closure of cam switch 76 occurs, the following circuit is established to subtract solenoid 38 from power terminal 12 along lead 64 to switch 58, along lead 70 and a lead 88 to the movable pole of cam switch 76, and thence along lead 82 to solenoid 38 and along the current path just described above to lead 24 and terminal 14.

Energization of subtract solenoid 38 shifts its pawl 44 into engagement with ratchet wheel 40 to rotate the same one increment in a counterclockwise direction. This brings lug 60 back into engagement with armature 52 to reopen switches 56 and 58. Additionally, switch 48 is closed by solenoid 38 to form a holding circuit along leads 90 and 92 for timer motor 68. Motor 68 thus continues to run until lobe 74 reaches the normal position thereof illustrated and reopens cam switch 76. The circuitry is now returned to the trickle charging mode.

An important feature of the control arrangement is the ability of stepper 34 to serve as a totalizer which counts the number of times load 30 is operated and then de-energized during operation of the charging circuit in the high level charging mode. If it is assumed that a load demand is made once as discussed hereinabove and that ratchet wheel 40 has been advanced by pawl 42 one increment in a clockwise direction, it will be seen that repeated load demands prior to resetting of stepper 34 will cause ratchet wheel 40 to advance additional increments as add solenoid 36 is repeatedly energized. If, therefore, during the first revolution of cam 72, load 30 is operated for two additional intervals, solenoid 36 will be energized and de-energized twice to cause a total clockwise movement of wheel 40 equal to three increments. Thus, when subtract solenoid 38 is subsequently energized by closure of cam switch 76 toward the end of the first revolution of cam 72, ratchet wheel 40 will be returned in a counterclockwise direction one increment, two additional increments then remaining before lug 60 will re-engage armature 52 and reopen switches 56 and 58.

Therefore, timer motor 68 remains energized and cam 72 continues for a second operational cycle, whereupon another increment will ultimately be subtracted when cam switch 76 is again closed.

Finally, at the end of the third revolution of cam 72 in the instant example, ratchet wheel 40 will be returned to its normal position, reopening switches 56 and 58. It will thus be appreciated that high level charging continues for a time period proportional to the number of load current demands placed on battery 16 and accumulated on totalizer ratchet 40.

Attention is directed to switch 46 which is open during periods of energization of load 30 and add solenoid 36. This switch is interposed in series between leads 84 and 86 in order to give priority to add counts should an occasion occur when both the add and subtract solenoids are required to operate simultaneously.

As in the trickle charging mode, high level charging is achieved by presenting a constant current source to load terminals 18. Although the series resistance in the charging circuit will likely be considerably reduced during high level charging, the parallel combination of load 30 and battery 16 presents a negligible resistance by comparison.

Although the description above has made particular reference to apparatus for charging nickel cadmium batteries, it is to be understood that the charger of this invention may be used with equal facility for charging of other types of batteries such as lead acid, mercury, and silver. Since each type of battery has its own unique characteristics the user selects one best fitted to a particular application. Thus, the charger would be adjusted as required to charge each type of battery at the proper rate and current, depending on the characteristics of such battery.

Having thus described the invention, what is claimed as new and desired to be secured by Letters Patent is:

1. A dual level battery charger comprising:
   terminal means adapted for coupling with a storage battery;
   a charging circuit connected to said terminal means for coupling the latter with a current source, whereby to deliver charging current to the battery; and
   control means coupled with said circuit and normally maintaining the magnitude of said charging current at a relatively low, trickle charging level, said control means being coupled with said terminal means and responsive to a demand for load current from said battery for increasing said magnitude to a substantially higher level, whereby to rapidly recharge the battery by an increased charging current when load current is drawn therefrom,
   said control means having a totalizer for registering said demand and for registering additional, subsequent load current demands, and means responsive to demand registration by said totalizer for effecting said increase in charging current magnitude for a time period dependent upon the number of demands registered by the totalizer,
   said registration responsive means including timer means having an operational cycle of predetermined duration, means for initiating operation of said timer means in response to registration of the first occurring load current demand, and means operably coupled with said timer means and responsive thereto for reducing by one the total number of registrations stored in said totalizer after a time elapses of no greater length than said predetermined duration,
   said operation initiating means maintaining said timer means operative to recycle the latter and thereby effect repeated actuation of the registration reducing means until said totalizer returns to a normal, zero registration condition,
   said totalizer being operable to effect termination of delivery of said charging current of increased magnitude upon said return of the totalizer to said zero registration condition.

2. The invention of claim 1,
   said totalizer including a stepper relay having a rotatable ratchet wheel, and an add solenoid provided with means engageable with said wheel for incrementally rotating the latter in one direction in response to said load current demands,
   said registration reducing means including a subtract solenoid provided with means engageable with said wheel for incrementally rotating the latter in the opposite direction to return the totalizer to said zero registration condition.

3. A dual level battery charger comprising:
   terminal means adapted for coupling with a storage battery having a low internal resistance, and a low resistance load therefor;
   a source of electrical energy;
   a charging circuit intercoupling said source and said terminal means;
   controllable resistance structure coupled with said circuit and having a pair of resistance-presenting states of high ohmic value relative to the resistances of said battery and said load whereby, in each of said states, a supply of substantially constant current is provided at said terminal means,
   said structure, in one of said states, limiting the flow of current in said circuit to a low, trickle charging level and, in the other of said states, permitting current of substantially increased magnitude to flow in said circuit; and
   control means coupled with said structure for normally maintaining the latter in said one state, said control means being coupled with said terminal means and responsive to a demand for load current from said battery for operating said structure to place the latter in said other state, whereby to rapidly recharge the battery by an increased charging current when load current is drawn therefrom,
   said control means including a totalizer for registering said demand and for registering additional, subsequent load current demands, and means responsive to demand registration by said totalizer for effecting said operation of the structure for a time period dependent upon the number of demands registered by the totalizer.

4. A dual level battery charger comprising:
   terminal means adapted for coupling with a storage battery; a charging circuit connected to said terminal means for coupling the latter with a current source to thereby deliver charging current to the battery, and having means normally maintaining the magnitude of said charging current at a relatively low, trickle charging level;
   a totalizer coupled with said terminal means and responsive to each demand for load current from said battery for accumulatively registering successive demands; and
   means coupled with said charging circuit and responsive to demand registration by said totalizer for increasing the magnitude of said charging current to a substantially higher level for a time period dependent upon the number of demands registered by the totalizer,
   said current increasing means being provided with totalizer reset means for returning the totalizer to a normal, zero registration condition at the close of said time period to terminate delivery of the higher level charging current and return the latter to the normal, trickle charging level.

5. The invention of claim 4,
   said reset means reducing by one the total number of demands accumulated by the totalizer after a predetermined time duration following said increasing of the magnitude of said charging current.

6. The invention of claim 5,
   said reset means having means effecting recycling thereof to cause repeated reduction of the total number of accumulated demands until the totalizer returns to said zero registration condition.

References Cited

UNITED STATES PATENTS

| | | | |
|---|---|---|---|
| 1,121,892 | 12/1914 | Beach | 320—34 |
| 1,786,280 | 12/1930 | Woodbridge | 320—23 X |
| 1,812,628 | 6/1931 | Geiger | 320—34 |
| 2,635,221 | 4/1953 | Harvey | 320—23 X |
| 3,018,432 | 1/1962 | Palmer | 320—39 X |
| 3,271,652 | 9/1966 | Walz et al. | 320—44 |
| 3,302,091 | 1/1967 | Henderson | 320—48 |

LEE T. HIX, *Primary Examiner.*

S. WEINBERG, *Assistant Examiner.*